United States Patent [19]

Kanzler, deceased et al.

[11] 4,253,991

[45] Mar. 3, 1981

[54] FLUIDIZED-BED CATALYSTS FOR PRODUCTION OF SYNTHETIC NATURAL GAS BY METHANIZATION OF CARBON MONOXIDE

[75] Inventors: Karl-Heinz Kanzler, deceased, late of Germering, Fed. Rep. of Germany, by Sigrid Kanzler, heiress; Karl Kochloefl, Moosburg, Fed. Rep. of Germany

[73] Assignee: Süd-Chemie Aktiengesellschaft, Munich, Fed. Rep. of Germany

[21] Appl. No.: 28,428

[22] Filed: Apr. 9, 1979

[30] Foreign Application Priority Data

Apr. 13, 1978 [DE] Fed. Rep. of Germany ....... 2816035

[51] Int. Cl.$^3$ .................. B10J 21/04; B01J 21/12; B01J 21/08; B01J 23/78
[52] U.S. Cl. ................. 252/455 R; 252/457; 252/458; 252/459; 252/466 J; 252/470; 252/472; 252/473; 252/474; 260/449.6 M
[58] Field of Search ............... 252/455 R, 466 J, 457, 252/458, 459, 472, 473, 474, 470; 260/449 M, 449.6 M

[56] References Cited

U.S. PATENT DOCUMENTS

| | | | |
|---|---|---|---|
| 2,579,663 | 12/1951 | Gilbert et al. | 260/449.6 M |
| 3,549,556 | 12/1970 | Dienes | 252/455 R |
| 3,947,381 | 3/1976 | Campbell et al. | 252/466 J |

Primary Examiner—W. J. Shine
Attorney, Agent, or Firm—Sprung, Felfe, Horn, Lynch & Kramer

[57] ABSTRACT

A fluidized-bed catalyst for the production of synthetic natural gas by the methanization of carbon monoxide which catalyst in the unreduced state contains nickel oxide on a carrier material resistant to temperature changes, and a hydraulic cement, said catalyst obtainable by compressing a composition comprising a carrier material and nickel oxide in admixture with hydraulic cement as binder in the wetted condition at a pressure above 1600 kp/cm$^2$ into a formed body, calcining the so-compressed formed body, curing the so-calcined formed body by treatment with water or steam, recalcining the so-cured formed body and comminuting the same and recovering a comminuted material having a particle size fraction ranging from 40 to 350$\mu$. Also disclosed is a process for production of synthetic natural gas by fluidized-bed methanization of carbon monoxide with hydrogen employing such a catalyst.

14 Claims, No Drawings

FLUIDIZED-BED CATALYSTS FOR PRODUCTION OF SYNTHETIC NATURAL GAS BY METHANIZATION OF CARBON MONOXIDE

The invention relates to fluidized-bed catalysts for the production of synthetic natural gas by the methanization of carbon monoxide in which the carbon monoxide is reacted with hydrogen, optionally with the addition of water vapor.

Methanization catalysts which in the unreduced state contain nickel oxide, optionally on a carrier material which is resistant to temperature changes, and a hydraulic cement as binder are known as fixed-bed catalysts from German patent application DAS No. 1,938,079, for example. These are spherical catalysts for the production of methane which are prepared by mixing from 5 to 40 wt. % of nickel oxide with from 0 to 75 wt. % of alumina as carrier material and with from 15 to 75 wt. % of a binder such as calcium aluminate cement and/or calcium silicate cement in the presence of water. The mixture is formed into spheres on a granulating apparatus, these spheres then being calcined and reduced, a certain density and a certain pore ratio being obtained in the process.

Attempts have been made to use such spherical catalysts, or catalysts of similar composition produced in extruders, as fluidized-bed catalysts by reducing the formed bodies to the particle size required for use in a fluidized bed. However, the fragments so obtained did not have satisfactory abrasion resistance. Thus it was found that the attrition ranged from about 2.5 to 10 wt. % per day, depending on the operating conditions employed.

It is further known to pelletize the wet starting mass for the production of catalysts. However, the pressures here used have been relatively low as it was feared that a high pressure would have the effect of reducing the porosity of the pellets especially at the surface to such an extent that it would entail a loss of activity.

Moreover, it has been sought to produce fluidized-bed catalysts for the cracking of higher hydrocarbons by agglomeration of the starting mass. To this end, a silicic acid sol, for example, is transformed, by spray drying or by dripping into hot oil, to spherules suited for use as fluidized-bed catalysts. However, these manufacturing processes are complicated and costly.

It is also known to impregnate fine particles of a hard carrier material, such as corundum, with solutions of the active catalyst constituents. However, the latter tend to remain on the surface of the carrier particles and are quickly abraded when these particles are used as fluidized-bed catalysts, and this will result in a loss of activity before long.

The invention has as its object to provide a fluidized-bed catalyst for the production of synthetic natural gas by the methanization of carbon monoxide whose attrition in use is less than about 2 wt. % per day. Despite the fact that its porosity is reduced as a consequence of its increased abrasion resistance, the catalyst is to have sufficient activity for the carbon monoxide to be converted to methane as close as possible to the thermodynamic limit, and this activity is to remain constant for an extended period. Finally, no carbon is to deposit on the catalyst even with a low molar ratio between hydrogen and carbon monoxide.

In accordance with the invention, these objects are accomplished through a fluidized-bed catalyst for the production of synthetic natural gas by the methanization of carbon monoxide which in the unreduced state contains nickel oxide on a carrier material resistant to temperature changes as well as a hydraulic cement, said catalyst being prepared by pressing a carrier material containing nickel oxide, or a mechanical mixture of nickel oxide and carrier material, in admixture with a hydraulic cement as binder in the wetted state at pressures above about 1600 kp/cm$^2$ into formed bodies, calcining the pressed formed bodies, and curing, recalcining and then comminuting them, and by producing from the comminuted material a particle-size fraction ranging from about 40 to 350$\mu$.

Under reaction conditions, the fluidized-bed catalysts in accordance with the invention exhibit an attrition of less than 2 wt. % per day. In some cases the attrition was found to range from 0.1 to 0.3 wt. % per day.

In the unreduced state, the fluidized-bed catalysts in accordance with the invention may contain from about 0 to 77 wt. %, and preferably from 20 to 60 wt. %, of carrier material.

Particularly well suited for use as carrier material are refractory inorganic oxides or silicates which have a neutral or basic surface character. Catalysts having an acidic surface character exhibit a tendency toward the formation of carbon deposits as they promote the Boudouard reaction ($2CO \rightarrow C + CO_2$). The surface character of the carrier material is determined by chemisorption of organic bases or acids. (K. Tanabe: Solid Acids and Bases, Academic Press, New York, 1970, pages 5 to 44.)

Preferred carrier materials are $Al_2O_3$, $ZrO_2$, $Cr_2O_3$, MgO, diatomaceous earth, and clay or clay minerals, in particular kaolin, $MoO_3$ and $WO_3$, and mixtures of these substances.

Particularly advantageous from the standpoint of hardness are $Al_2O_3$, $Cr_2O_3$ and diatomaceous earth, which form very hard agglomerates with the cement binders.

The friability of the fluidized-bed catalysts can be reduced by the use of certain mixtures of carrier materials. This friability results in increased attrition, especially over the first few hours of operation, since the particles are still irregularly shaped right after comminution and are not ground down. Carrier substances which will reduce the friability are clays or clay minerals, and particularly kaolin, as well as molybdenum trioxide and tungsten trioxide. The two last-mentioned substances will also increase the resistance of the catalysts to the sulfur components contained in the reaction gases and will therefore contribute to an increase in the long-term activity of the catalysts in accordance with the invention.

The proportion of the friability-reducing carrier materials kaolin, $MoO_3$ or $WO_3$ in the carrier-material mixture is preferably as much as 50 wt. %.

An essential constituent of the fluidized-bed catalysts in accordance with the invention is hydraulic cement, which serves as binder for the pure nickel oxide, or for the nickel oxide deposited on the carrier material. The hydraulic cement used is preferably Portland cement or calcium aluminate cement. The cement need not be particularly pure; for example, even portland cement used in construction, which still contains some iron, may be used. In fact, the presence of iron in the cement is desirable in some cases since small amounts of ethane will then form in addition to the methane. When the synthetic natural gas contains ethane, it has a higher heat value approaching that of natural gas.

Generally the fluidized-bed catalysts in accordance with the invention contain, in the unreduced state, from about 3 to 60 wt. % NiO and from about 20 to 40 wt. % hydraulic cement, the rest consisting mostly of carrier material.

The catalysts in accordance with the invention preferably have a particle size of about 64 to 240μ. It has been found that on the one hand this particle-size range is optimum for use of the catalyst in a fluidized bed, and on the other hand it can be readily obtained in relatively high yield through size reduction of the pellets in a roll mill without an unduly high fraction of undersize.

As has been pointed out, a pressure of not less than about 1600 kp/cm$^2$ is required for the pressing of the formed bodies. Only above that pressure will the nickel oxide particles, or the carrier particles laden with the nickel oxide, be united with the hydraulic cement particles in such a way that the desired abrasion resistance is obtained. In other words, it is not sufficient to unite the cement particles with the other particles in the presence of water without the use of pressure, or only at low pressure, since the agglomerates so obtained would not possess a satisfactory abrasion resistance. In general the abrasion resistance increases with increasing pressure, but usually only up to a pressure of about 3200 kp/cm$^2$, and higher pressures therefore are not employed as a rule.

The fluidized-bed catalysts in accordance with the invention generally are prepared as follows:

The carrier material laden with nickel oxide, or a mechanical mixture of carrier material and finely divided nickel oxide, is mixed dry with hydraulic cement in the quantitative ratios specified above. If it is desired to prepare a carrier-supported catalyst, it is not absolutely necessary that the carrier material be already laden with the nickel oxide. The procedure may be such that powdered nickel oxide is mixed dry with the carrier material and the hydraulic cement. When a carrier material already laden with nickel oxide is used, it may have been produced in an earlier stage by impregnation of the carrier material with a nickel salt solution, or by coprecipitation of the carrier material and the nickel oxide, followed by calcination.

The dry mixing of the constituents may generally be regarded as completed after about 10 to 20 minutes since the mixture usually is sufficiently homogeneous after that length of time. As a rule, demineralized water is added to the dry mixture to give a viscous mass. The water added usually represents from 40 to 50 wt. %.

In some cases it will be advisable to add also graphite or other lubricants such as aluminum stearate for the subsequent pressing of formed bodies. The admixing of the lubricant will take about 5 to 10 minutes.

In some cases it will be advisable to subject the paste-like catalyst mass to preliminary drying. The latter may be carried out at about 100° to 120° C. When the catalyst mass has been wetted with from 40 to 50 wt. % of water, as specified above, the drying may be carried to a drying loss of from 14 to 16 wt. %.

Following wetting and predrying, the catalyst mass is pressed into formed bodies. Pellets measuring 4×4 mm or 6×6 mm (diameter × height), for example, may be produced. This is preferably done at a pressure of about 1600 to 3200 kp/cm$^2$. Higher pressures usually are not required as they do not result in a further increase in abrasion resistance. The pressure specified will yield pellets which in the "green" condition, that is to say, in the uncalcined state, possess a crush strength of about 1 to 2 kg/mm of circumferential length.

The formed bodies then are usually aged for a few days. For example, they may be stored for three to six days at room temperature in a closed vessel.

The formed bodies may then be precalcined at about 190° to 230° C. over a period of from four to six hours. This is followed by a curing treatment carried out either by soaking the catalyst bodies in demineralized water or by treating them with steam. The curing time in water at room temperature (about 20° C.) is about 24 to 48 hours. The curing time in the case of a steam treatment at about 150° C. (5 bars) may be about 12 hours, for example. The temperatures and times of the water or steam treatment for ageing of the formed catalyst bodies may, of course, be varied over a wide range.

After the ageing, the formed catalyst bodies are recalcined at temperatures which may range from about 230° to 450° C. Generally the duration of such calcination will range from four to six hours, as in precalcination. Recalcination yields formed catalyst bodies possessing a crush strength of from 4 to 6 kg/mm of circumferential length. The pellets are then advantageously reduced in size in a roll mill having a gap between the rolls that is adjustable between 2 and 0.2 mm. As a rule, from four to eight passes through the mill will suffice. The particles obtained are screened and subjected to air separation for removal of the fines from the milled material. A particle-size fraction ranging from about 40 to 350μ, and preferably from about 64 to 240μ, is then obtained in a yield of about 65 to 85 wt. %, based on the pellets. Thus the type of milling specified permits a high proportion of the desired particle-size fraction to be obtained.

Alkali, and preferably a potassium salt, may also be added to the catalyst in an amount of up to about 3 wt. % (calculated as K$_2$O equivalent on the unreduced catalyst). The addition of the alkali may be effected during the dry mixing of the constituents or during wetting. The alkali addition has the effect of suppressing the deposition of carbon on the catalyst.

Before they are used as fluidized-bed catalysts, the catalyst particles produced must be reduced at least partially. The reduction may be effected in the methanization plant or in a separate plant. The reduction conditions for nickel catalysts as such are known. First the air in the reaction vessel is displaced with an inert gas such as nitrogen, then hydrogen is passed in gradually increasing concentration over the heated catalyst. The reduction temperature generally ranges from about 380° to 430° C. As a rule it will suffice for the degree of reduction (NiO→Ni) to be between 70 and 80%.

The invention further relates to a process for the production of synthetic natural gas by the methanization of carbon monoxide with hydrogen in a fluidized-bed reactor by the use of a catalyst obtained by the method described.

The methanization is generally carried out a temperatures of about 250° to 550° C. at a molar ratio of H$_2$/CO of from 1.5:1 to 3.5:1 or higher. It essentially involves the following reactions:

$$CO + 3H_2 \rightarrow CH_4 + H_2O$$

$$CO + H_2O \rightarrow CO_2 + H_2$$

or $$2CO + 2H_2 \rightarrow CH_4 + CO_2$$

The methanization is generally carried out at a space velocity of about 1000 to 3000 liters of gas mixture per hour and liter of catalyst. The pressure is about 5 to 60 preferably 5 to 30 bars.

The synthetic natural gas produced with the aid of the catalysts in accordance with the invention contains up to about 88 vol. % of methane (after elimination of the water vapor and of the residual $CO_2$). If a gas of a lower methane content, and hence of a lower heat value, is obtained, the calorific value may be increased by producing in the gaseous reaction mixture $C_2H_6$ as a byproduct of methane in a proportion of about 0.5 to 5 vol. %. This is accomplished by incorporating in the catalyst additions of Fe, Co and/or Th in amounts of about 0.1 to 1.0 wt. %.

The invention will now be explained by means of the examples which follow, given by way of illustration but not limitation:

EXAMPLE 1

30 kg of nickel oxide containing diatomaceous earth (63.5 wt. % NiO), prepared by thermal decomposition of nickel ammine carbonate solution in the presence of diatomaceous earth followed by calcination, is mixed dry with 39.3 kg kaolin, 31.5 kg diatomaceous earth and 44.6 kg portland cement in a mix-muller. After 15 minutes of intensive mixing, 65 liters of demineralized water are added in portions, and mixing is continued for another 10 minutes. 4.8 kg graphite is then added and mixing is continued for still another 10 minutes. The mass so obtained is then dried at 110° C. until the drying loss is 15 wt. %. The mass is then formed at a pressure of 2800 kp/cm² into 4×4 mm pellets, which are stored for 5 days in a closed vessel and then precalcined for 5 hours at 220° C. The precalcined pellets are later subjected to a cure by means of steam at 150° C. and a pressure of 5 bars for 12 hours. This process is completed with a final calcination (220° C., 5 hours). The pellets so produced possess a side-pressure resistance of not less than about 25 kg/pellet.

The size reduction of these pellets is effected in a roll mill having a gap of 2 mm. From the granules produced, particles smaller than 240μ are removed by screening, and the rest is comminuted further in the roll mill after the gap has been set for 1 mm. After screening, this process is repeated twice, the gap between the rolls being reduced to 0.5 mm in the third and fourth passes, and finally to 0.2 mm.

From the milled material so obtained, particles smaller than 64μ are removed by air separation. The yield of the particle-size fraction of 64 to 240μ is 80 wt. %, based on the tablets used. The attrition of the unreduced granules, measured by the cyanamide test (Forsythe and Hertwig, Ind. Eng. Chem. 41 [1949], 1200) is between 0.2 and 0.6 wt. % per day. In the reduced state, the attrition usually is only about one-half, that is to say, about 0.1 to 0.3 wt. % per day.

The reduction of the methanization catalyst is effected directly in the fluidized-bed reactor at 420° C. and a pressure of from 1 to 5 bars with pure hydrogen. (Space velocity, 500 std. m³/h/m³ cat.) After 24 hours, a degree of reduction (based on NiO) of about 75 wt. % is usually obtained.

EXAMPLE 2

45 g of nickel oxide containing alumina (70% NiO), prepared by coprecipitation of nickel nitrate and aluminum nitrate with potassium carbonate followed by calcination at 400° C., is mixed dry with 100 kg aluminum oxide trihydrate (hydrargillite) and 64 kg calcium aluminate cement in a mix-muller for 15 minutes. 50 liters of demineralized water are then added in portions and mixing is continued for another 10 minutes. 6.4 kg graphite is then added and mixing is continued for still another 10 minutes.

The further processing (predrying, forming and hardening with steam) is carried out as described in Example 1. The final calcination is effected at 400° C. for 12 hours. The finished pellets of 4×4 mm produced by this method have a crush strength of about 28 kg/pellet. The desired granules (64 to 240μ) are produced as in Example 1. The yield of this particle-size fraction is about 75 wt. %, based on the pellets used. The attrition is not more than about 1.8 wt. %/day and in the reduced state is from one-third to one-half less. The reduction of this fluidized-bed catalyst is effected in accordance with Example 1.

EXAMPLE 3

32 kg nickel oxide is mixed dry with 12 kg molybdenum trioxide (bulk density, 325 g/l), 180 kg aluminum trihydrate (hydrargillite) and 60 kg portland cement in the mix-muller for 15 minutes. 90 liters of demineralized water are then added in portions and mixing is continued for another 10 minutes. 6.4 kg graphite is then added and mixing is continued for still another 10 minutes. The further processing (predrying, forming and steam hardening) is carried out as in Example 1. The final calcination is carried out at 230° C. for 4 hours. The 4×4 mm pellets produced by this method have a crush strength of about 16 kg/pellet. The desired granules (64 to 240μ) are produced as in Example 1. The yield of this particle-size fraction is about 78 wt. %, based on the pellets used. The attrition is not more than about 0.8 wt. %/day and in the reduced state is from one-third to one-half less. The reduction of this fluidized-bed catalyst is effected as in Example 1.

EXAMPLE 4

45 kg of mixed oxides (70 wt. % NiO, 25 wt. % $Al_2O_3$, 5 wt. % $Cr_2O_3$), prepared by coprecipitation of the corresponding nitrates with potassium carbonate followed by calcination at 400° C., is mixed dry with 100 kg of calcium aluminate cement in the mix-muller for 15 minutes. 50 liters of aqueous potassium hydroxide solution (containing 0.7 kg KOH) are then added in portions, and mixing is continued for another 10 minutes. 5.5 kg graphite is then added, and mixing is continued for still another 10 minutes.

The further processing (predrying, forming and steam curing followed by final calcination) is carried out as in Example 2. The 4×4 mm pellets produced by this method have a crush strength of about 27 kg/pellet. The desired granules (64 to 240μ) are produced as in Example 1. The yield of this particle-size fraction is about 78 wt. %, based on the pellets used. The attrition is not more than 1.7 wt. %/day. The reduction of this fluidized-bed catalyst is effected as in Example 1.

APPLICATION EXAMPLE 1

Over a reduced fluidized-bed catalyst prepared as described in Example 2, a gas mixture (24.0 vol. % CO, rest $H_2$; molar ratio $H_2/CO=3.17$) is passed, at 400° C. and a total pressure of 15 bars, at a space velocity of 1100 liters of gas mixture per liter of catalyst and hour, the ratio between gas entering and gas circulating being maintained at 1.8. The gas exiting (after elimination of H₂O) has the following composition:

CO—0.9 vol. %
CO₂—1.2 vol. %
CH₄—74.6 vol. %
H₂22.8 vol. %

The catalyst attrition under these conditions is about 0.8 wt. %/day after a breaking-in time of 24 hours. No change in CO conversion is observable after 48 hours' operation.

APPLICATION EXAMPLE 2

Over a reduced fluidized-bed catalyst prepared as described in Example 3, a gas mixture (28.6 vol. % CO, rest H₂; molar ratio H₂/CO=2.5) containing about 300 ppm H₂S is passed, at 420° C. and a total pressure of 70 bars, at a space velocity of 1030 liters of gas mixture per liter of catalyst per hour, the ratio between gas entering and gas circulating being maintained at 1.5. The gas exiting (after elimination of H₂O) has the following composition:

CO—0.8 vol. %
CO₂—12.7 vol. %
CH₄—73.8 vol. %
C₂H₆—0.4 vol. %
H₂—12.3 vol. %

Under these conditions, the catalyst attrition is about 1.2 wt. %/day after a breaking-in time of 24 hours. No change in CO conversion is observable after 48 hours of operation.

The catalyst of the present invention (in the reduced state) preferably contains the components thereof in amounts between the ranges set forth below:

| COMPONENT | BROAD RANGE | PREFERRED RANGE |
| --- | --- | --- |
| Nickel (as oxide) | 3–60 wt% | 9–50 wt% |
| Carrier | 0–77 | 15–66 |
| Hydraulic cement | 20–40 | 25–35 |

During catalyst preparation, the catalyst material is wetted to a moisture content of between 15 and 35 weight percent. Following the compression of the catalyst into formed bodies, it may be calcined at a temperature of 150° and 250° C. for 3 to 8 hours. Calcination is followed by the aforesaid water treatment using either liquid water or steam. The water treatment imparts between 5 and 35 weight percent to the catalyst. This water treatment is followed by a further calcination at about 200° to 450° C. for 3 to 15 hours followed by comminution to the desired particle size.

We claim:

1. A fluidized-bed catalyst for the production of synthetic natural gas by the methanization of carbon monoxide which catalyst in the unreduced state contains nickel oxide or nickel oxide on a carrier material resistant to temperature changes, and a hydraulic cement, said catalyst obtainable by compressing a composition comprising nickel oxide or a carrier material and nickel oxide in admixture with hydraulic cement as binder in the wetted condition at a pressure above 1600 kp/cm² into a formed body, calcining the so-compressed formed body, curing the so-calcined formed body by treatment with water or steam, recalcining the so-cured formed body and comminuting the same and recovering a comminuted material having a particle size fraction ranging from 40 to 350μ.

2. A fluidized-bed catalyst according to claim 1 which in unreduced state contains 0 to 77 weight percent of carrier material.

3. A fluidized-bed catalyst according to claim 1 wherein the carrier materials are refractory inorganic oxide or silicate.

4. A fluidized-bed catalyst according to claim 3 wherein the carrier material contains Al₂O₃, ZrO₂, Cr₂O₃, MgO, kaolin, MoO₃, WO₃ or diatomaceous earth or a mixture thereof.

5. A fluidized-bed catalyst according to claim 4 wherein the amount of kaolin, MoO₃ or WO₃ in the carrier material is up to 50% by weight.

6. A fluidized-bed catalyst according to claim 1 wherein said hydraulic cement is Portland cement or calcium aluminate cement.

7. A fluidized-bed catalyst according to claim 1 wherein in the unreduced state the catalyst comprises 3 to 60 weight percent nickel oxide and 20 to 40 weight percent hydraulic cement.

8. A fluidized-bed catalyst according to claim 1 wherein the comminuted material has a particle size of about 64 to 240μ.

9. A fluidized-bed catalyst according to claim 1 formed by compressing the wetted composition at a pressure in the range of about 1600 to 3200 kp/cm², calcining the same at a temperature of 150° to 250° C. and, following the curing with water or steam, recalcining the same at a temperature in the range of 200° to 450° C.

10. A fluidized-bed catalyst according to claim 1 wherein the calcined compressed formed body is cured with water at room temperature for 24 to 48 hours.

11. A fluidized-bed catalyst according to claim 1 wherein the calcined compressed formed body is cured by treatment with steam at a temperature of about 150° C. for about 12 hours.

12. A fluidized-bed catalyst according to claim 1 additionally containing an alkali metal in an amount of up to about 3% by weight, calculated as the oxide on the basis of unreduced catalyst.

13. A process for producing a fluidized-bed catalyst useful for the production of synthetic natural gas by the methanization of carbon monoxide which comprises compressing a composition comprising nickel oxide alone or in admixture with a carrier material which nickel oxide is in admixture with a hydraulic cement as binder in the wetted condition at a pressure above 1600 kp/cm² into a formed body, calcining the so-compressed formed body, curing the so-calcined formed body by treatment with water or steam, recalcining the so-cured formed body and comminuting the same and recovering a comminuted material having a particle size fraction ranging from 40 to 350μ.

14. A fluidized bed catalyst according to claim 1, whose attrition in use is less than about 2 weight per cent per day.

* * * * *